F. G. KAPELMAN.
BUTTER CUTTER.
APPLICATION FILED JUNE 15, 1908.
916,714.
Patented Mar. 30, 1909.
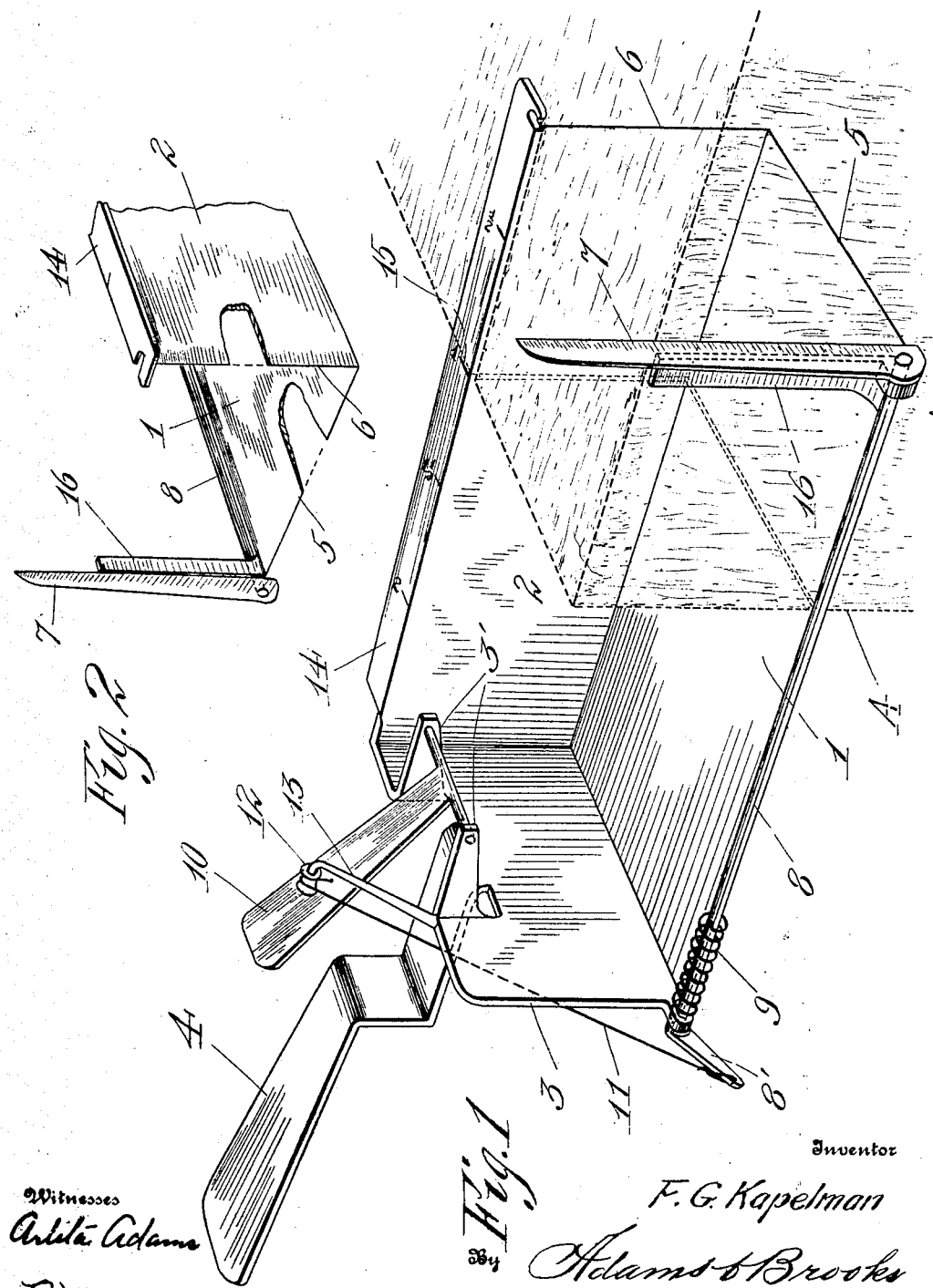
Witnesses
Arleta Adams
E. W. Cressman
Inventor
F. G. Kapelman
By Adams & Brooks
Attorneys

UNITED STATES PATENT OFFICE.

FELIX G. KAPELMAN, OF SEATTLE, WASHINGTON.

BUTTER-CUTTER.

No. 916,714.  Specification of Letters Patent.  Patented March 30, 1909.

Application filed June 15, 1908. Serial No. 438,684.

*To all whom it may concern:*

Be it known that I, FELIX G. KAPELMAN, a citizen of the United States of America, and a resident of the city of Seattle, in the county of King and State of Washington, have invented certain new and useful Improvements in Butter-Cutters, of which the following is a specification.

My invention has special reference to improvements in implements for cutting and removing from bodies of butter portions thereof of predetermined volume or weight.

The primary object of the invention is to provide a simplified and improved device of the above type.

Further objects and advantages will be set forth as the description progresses and those features on which I desire protection defined in the appended claims.

In the accompanying drawing I have illustrated the invention in such form as now preferred by me.

With reference to the drawing, wherein similar reference characters designate corresponding parts throughout: Figure 1 is a perspective view illustrating my improved implement in operation on a body of butter, and Fig. 2 is a fragmentary perspective view thereof in broken section.

The present invention includes a carrier as 1 conveniently consisting of a rectangular plate having angular side and end extensions 2, 3 respectively, to the latter of which is secured a rearwardly projecting handle 4. The carrier 1 and extension 2 are each sharpened along the forward edge to conveniently provide cutters as 5 and 6 which are adapted to produce an angular dividing cut by endwise movement of the device.

Lying in substantially a common plane with cutters 5 and 6 is a cutter or blade 7 which is secured to a rock shaft 8 extending longitudinally of carrier 1 opposite to extension 2. This shaft is supported in suitable journals and connected with a retracting spring as 9 arranged to yieldingly hold the shaft in normal position with cutter 7 extending vertically, as clearly shown.

To operate cutter 7 for cutting I have provided a thumb lever 10 which is disposed above the base of handle 4 and fulcrumed on lugs 3' of extension 3. This lever is connected with an arm 8' of shaft 8 by means of a cord or wire 11 which plays on a guide 12 supported above lever 10 on a bracket 13 of extension 3.

14 designates a guide conveniently consisting of an outturned side edge portion of extension 2 which is provided with graduations as 15 suitably arranged relatively to the plane of cut of cutter 7 to indicate the required length of the portion of butter to be cut to obtain a desired weight as will be understood from the following.

Opposite to cutter 6 is a gage, as 16 which extends upwardly from carrier 1 to indicate the width of the portion of butter to be cut.

In operating on a body of butter as A, the operator grasps handle 4 and presses the device endwise into said body at one corner with guide 14 engaging the top surface thereof and gage 16 just clearing the adjacent side surface of such body until the graduation on said guide which indicates the weight of butter desired registers with the adjacent edge of the body. The thumb is then applied to lever 10 to depress the same and thereby swing cutter 7 downwardly to sever the portion of butter on carrier 1 from the body. The device may then be removed with the portion of butter cut and inverted to transfer such portion to a sheet of wrapping paper.

Having thus described my invention, what I claim as new, and desire to secure by Letters Patent of the United States of America, is:

1. An implement for cutting and transferring comprising a carrier having a handle for movement into a body of butter, cutting means movable with the carrier for producing a dividing cut, a cutter movable on the carrier for transverse cutting, a thumb lever on the carrier extending over said handle, and connected with said cutter to move the same.

2. An implement for cutting and transferring comprising a carrier having a handle, cutting means movable with the carrier for producing a dividing cut, a shaft journaled on said carrier, a cutter fixed to said shaft for producing a transverse cut, and means arranged in proximity to the handle of said carrier and connected to said shaft to rotate the same.

Signed at Seattle, Washington this 28 day of May 1908.

FELIX G. KAPELMAN.

Witnesses:
HERCHMER JOHNSTON,
FRANK E. ADAMS.